April 26, 1949. H. G. BUSIGNIES 2,468,032
DIRECTION AND DISTANCE INDICATING SYSTEM
Filed Feb. 28, 1941 4 Sheets-Sheet 1

INVENTOR.
HENRI G. BUSIGNIES
BY
ATTORNEY

April 26, 1949.  H. G. BUSIGNIES  2,468,032
DIRECTION AND DISTANCE INDICATING SYSTEM
Filed Feb. 28, 1941  4 Sheets-Sheet 2

INVENTOR.
HENRI G. BUSIGNIES
BY
ATTORNEY

April 26, 1949.  H. G. BUSIGNIES  2,468,032
DIRECTION AND DISTANCE INDICATING SYSTEM
Filed Feb. 28, 1941  4 Sheets-Sheet 4

INVENTOR.
HENRI G. BUSIGNIES
BY
ATTORNEY

Patented Apr. 26, 1949

2,468,032

UNITED STATES PATENT OFFICE 2,468,032

DIRECTION AND DISTANCE INDICATING SYSTEM

Henri G. Busignies, Forest Hills, N. Y., assignor to International Standard Electric Corporation, New York, N. Y., a corporation of Delaware Application February 28, 1941, Serial No. 380,982

4 Claims. (Cl. 343—11)

1

The present invention relates to methods and means for measuring direction and distances by electromagnetic waves and more particularly to methods and apparatus for producing simultaneous indications of the direction and distance of an object.

Distance finding systems wherein pulses of electromagnetic waves are transmitted to a distant object, reflected by the object, received at the source from which they were emitted and applied to an indicator are known. Also distance finding systems employing frequency modulated electromagnetic waves which are transmitted to a distant object, reflected, received and applied to an indicator are known. It is also known in the art to transmit electromagnetic energy and to receive this energy, either the transmitter or the receiver being highly directive, for the purpose of indicating the direction of an object or a station. In many of these systems it is necessary to employ two transmitters for obtaining both of the indications, namely an indication of distance and an indication of direction. According to the present invention the same energy that is employed for detecting the distance of an object is also employed for detecting the direction of an object.

One object of the present invention is to provide methods and apparatus for obtaining in a simple manner simultaneous indications of the direction and distance of an object.

Another object of my invention is to provide methods and apparatus for surveying the entire field surrounding a point and to thereby obtain the direction and distance of any object within this field. My invention is particularly applicable to the detection of moving vehicles such as aeroplanes. However, my invention is not restricted to such a use since it may also be employed on moving vehicles for the purpose of detecting other moving vehicles or distant objects.

In accordance with one embodiment of my invention pulses of electromagnetic waves are emitted from a first antenna system toward a distant object. A portion of the waves transmitted toward the distant object will be reflected, and these reflected waves are received by a second antenna system. At least one of these antenna systems is directive and preferably highly directive. The directive antenna system is rotated at a uniform rate. It is also possible to make both of the antenna systems directive, and in this case the antennas of the systems must be rotated in synchronism. The received waves are converted into controlling voltage pulses which are applied to the control elements of a cathode ray tube. A cathode ray tube is the preferred type of indicator in the present invention, but other types of indicators may also be employed. The cathode ray of the cathode ray tube is given a circular and radial motion by means of suitable circuits. When the control pulses are applied to the cathode ray intensity control element, and the circular and radial motion is properly synchronized with the rotation of the directive antenna system, or systems and the pulses which are emitted, a series of spots at first increasing in brilliance and then decreasing in brilliance will appear on the screen of the cathode ray tube. The location of these spots with respect to the center of the screen and the circumference of the screen gives an indication of the direction and distance of the object which intercepted the transmitted waves.

Although I prefer the above method of producing simultaneous direction and distance indications due to the accuracy of indications and simplicity of apparatus employed, it is also possible to employ within the scope of the invention frequency modulated electromagnetic waves. In accordance with this second embodiment of the invention frequency modulated waves are transmitted from a first antenna system toward a distant object. A portion of the transmitted waves are reflected by the object and are received by a second antenna system. As in the above system either or both of the antenna systems may be directive, and as in the above system one or both of the antenna systems are rotated at a uniform rate. The received waves are mixed with the transmitted waves in a receiver having a limited amount of automatic volume control. The beat note of the received and transmitted waves is fed to a discriminating and detecting circuit, which in turn controls the output voltage of a sweep circuit associated with a cathode ray tube. As in the above system the cathode ray of the cathode ray tube is given a circular and radial motion by suitable circuits. In this system, a plurality of radial lines varying in amplitude appears on the screen of the cathode ray tube. The height of the peak amplitude of these radial lines gives an indication of the distance of the object which intercepted the transmitted waves, and the position of the peak in relation to the circumference of the screen gives an indication of the direction of the object.

My invention will be more clearly understood by referring to the particular description made in connection with the accompanying drawings wherein.

Figure 6:
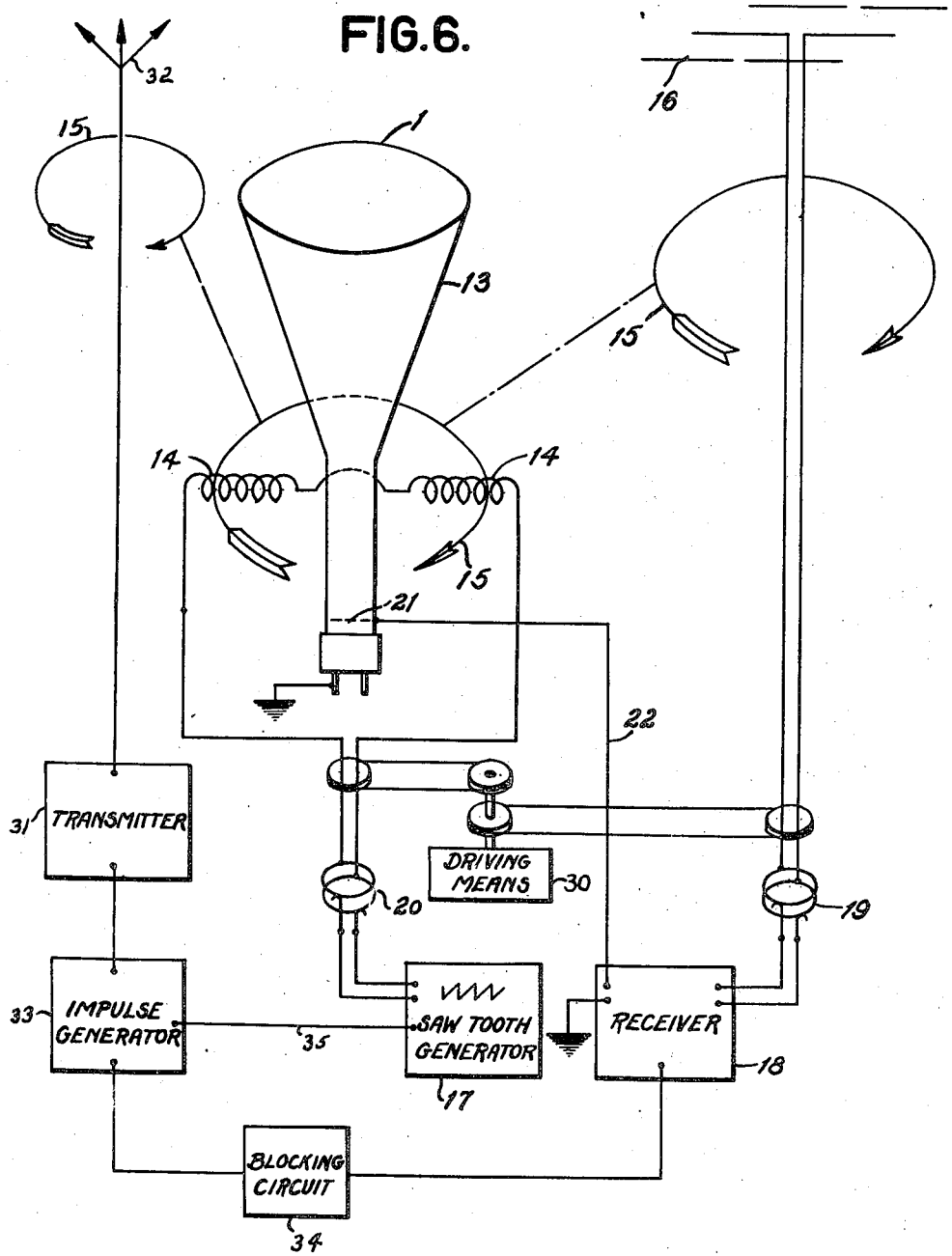
Figure 7:
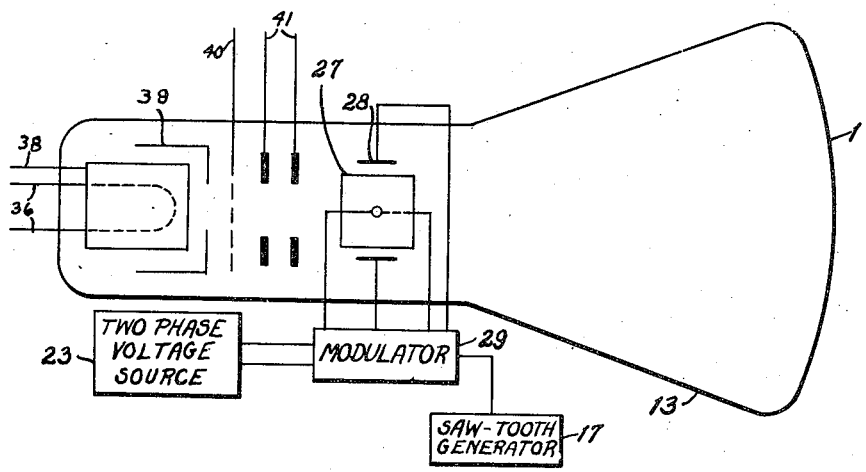
Figure 8:
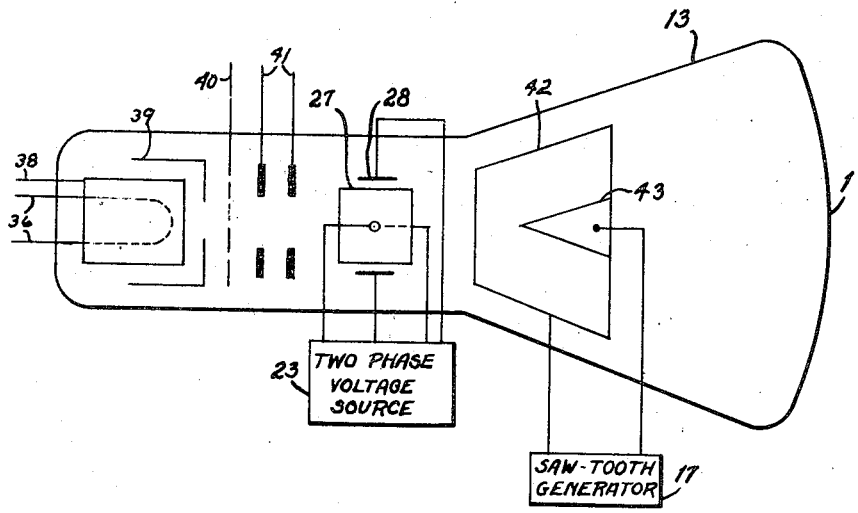

Figs. 6, 7, and 8 illustrate schematically apparatus for carrying out the method of my invention.

Figure 1:
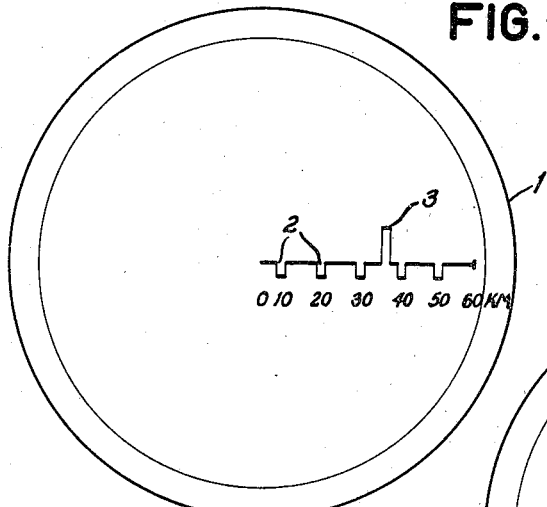
Fig. 1 illustrates a normal indication obtained on cathode ray tube screens employed in known systems.

In known systems for measuring the distance of an object by pulses of electromagnetic waves the indications usually obtained on the screen of a cathode ray tube are illustrated by the wave form shown in Fig. 1. The numeral 2 indicates the pulses employed for a scale of distance. These pulses are usually obtained by feeding some of the transmitted pulses from the transmitter to the receiver. The pulses are used to deflect the cathode ray in any well known manner. The pulse indicated by the numeral 3 is a reflected impulse, and by measuring the distance of the pulse 3 from the reference point O, one can obtain a direct reading of the distance of the reflecting object from the transmitting source. It is also known to use the position of the receiving antenna system when the pulse 3 has its maximum amplitude for indicating the direction of the reflecting object.

Figure 2:
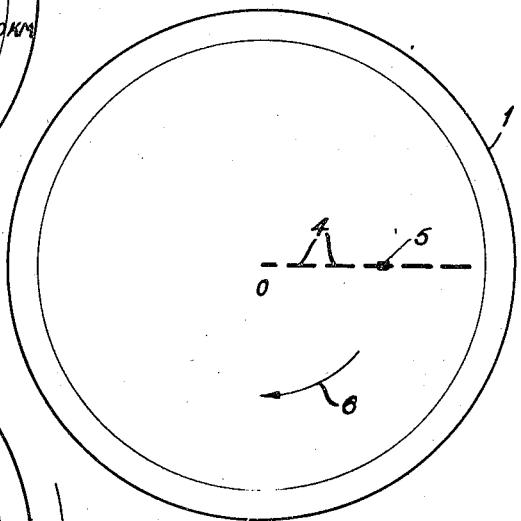
Fig. 2 illustrates an indication obtained on a cathode ray tube screen when the ray is modulated in intensity by impulses returning from a reflecting object and by impulses from a transmitter, these latter impulses being used as a scale of distance.

Fig. 2 illustrates the indication obtained on the oscillograph screen when the ray of the tube is modulated in intensity by the reflected pulses and the pulses obtained directly from the transmitter. The indication shown is, therefore, constituted by an interrupted line 4, the intervals of this line corresponding to the pulses 2 of Fig. 1 and the spot 5 corresponding to the pulse 3 of Fig. 1. As in the above case, the distance of the spot 5 from the point O indicates the distance of the reflecting object from the transmitting source. The direction of the reflecting object is given independently by orientation of the antenna system for a manual system, or by the orientation of the line 4 if the antenna system is continuously rotated at a uniform rate, for example, in the direction of arrow 6.

Figure 3:
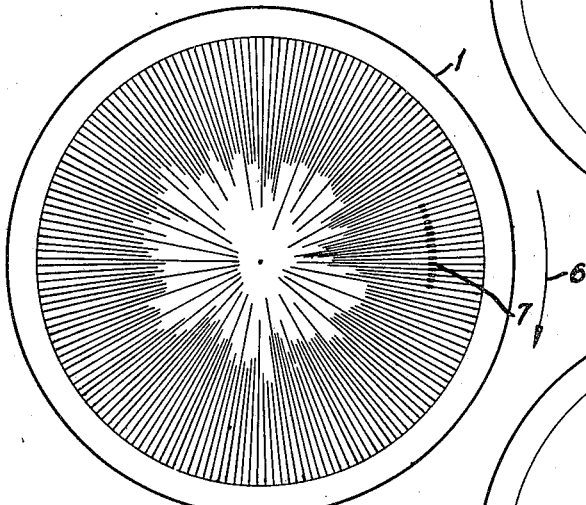
Fig. 3 illustrates the indication obtained on the end of a cathode ray tube when the cathode ray is modulated in the manner indicated in Fig. 2 and given a circular motion.
Figure 4:
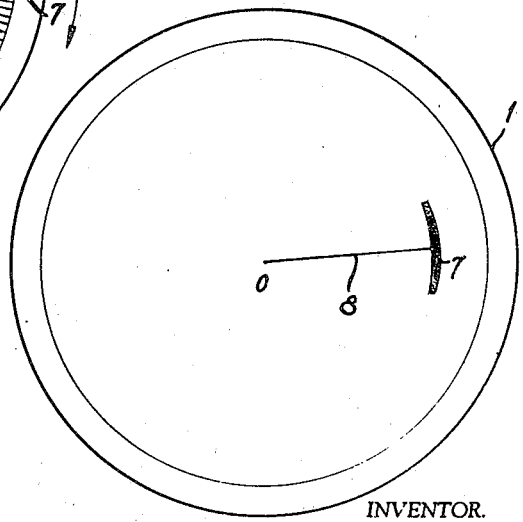
Fig. 4 illustrates the indication obtained when the cathode ray is modulated in the manner illustrated by Fig. 3 and the screen of the tube has a fairly long luminous persistence.

If, instead of leaving the line 4 fixed as a horizontal line, as shown in Fig. 2, the line is rotated at the same time that the antenna system is rotated, an indication such as that shown in Fig. 3 will be obtained. The cathode ray in this case is rotated in the same direction as the receiving antenna system. The indication of the distance of the object consists of an arc of a circle 7 having a greater brightness than the radial lines produced by the sweep circuit. Although the radial lines in Fig. 3 have not been shown as extending to the center of the screen, it is to be understood that I prefer to have the cathode ray sweep to the center of the screen for each line. I have shown the radial lines as terminating before reaching the center merely for convenience in illustration. The radius of this arc 7 indicates the distance of the reflecting object from the transmitting source. To further emphasize the arc 7 on the screen 1, I provide a screen which has a fairly long persistence. In accordance with this latter arrangement, substantially only the arc 7 will appear on the screen 1, as shown in Fig. 4. This arc 7 has an appreciable length, corresponding to the width of the exploring field of the emitter or receiver (for example, 10 or 15 degrees, or more), and the arc has a greater brilliance at its center than at its side, because of the fact that the reflected waves will be at a maximum when the direction of maximum sensitivity of the rotating, receiving, or transmitting antenna system coincides with the direction of the reflecting object. As shown in Figs. 3 and 4, the arc 7 has its greatest brilliance when the rotating antenna system has its direction of maximum sensitivity aligned with the direction indicated by a horizontal line on the screen shown in the figures. The direction of the object is, therefore, simultaneously given by a radial line 8 intersecting the spot of greatest brilliance of the arc, or passing through the mean point of the arc 7.

Figure 5:
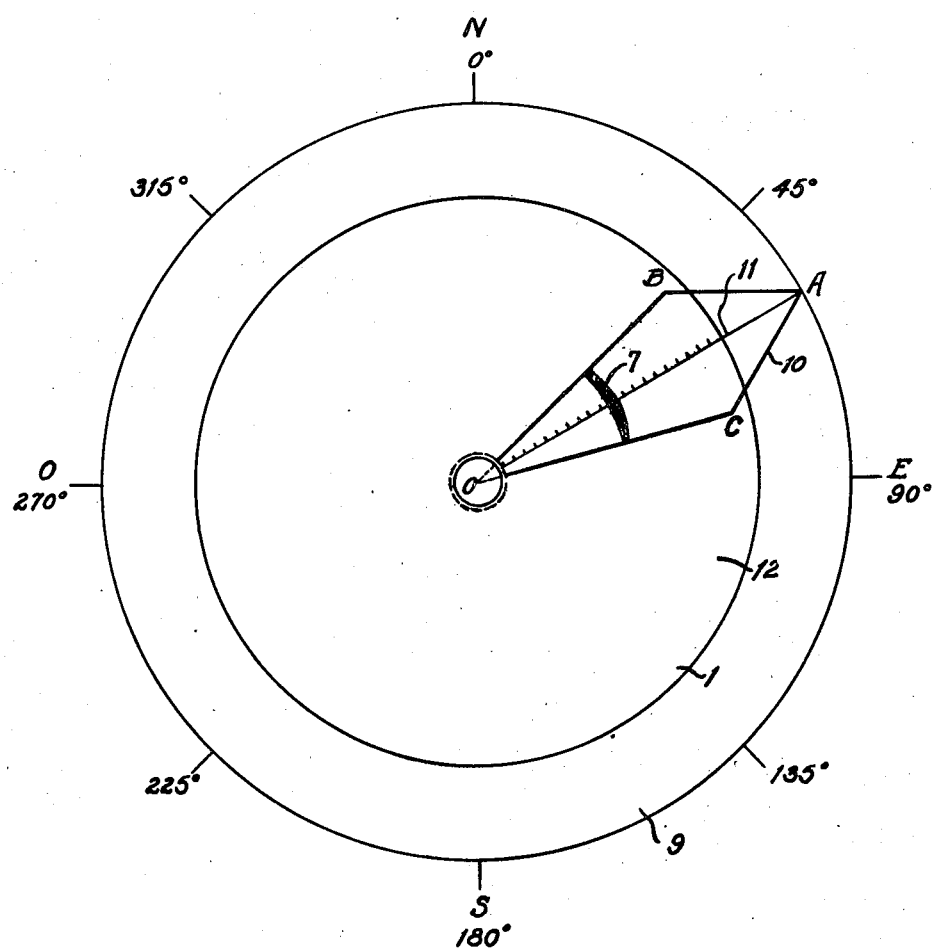
Fig. 5 illustrates a cathode ray tube screen provided with an alidade to determine the direction and/or distance of an indication on the screen in accordance with a preferred method of my invention.

Fig. 5 illustrates a preferred method of graduating the screen of a cathode ray tube. The screen 1 is encircled by annular graduations 9 indicating the azimuth with respect to the center O of the screen. This graduation 9 can obviously be made independent of the screen, but preferably, the graduations are made directly on the surface of the tube. At the center of the screen, at the point O, is pivoted an alidade 10. This alidade 10 may be rotated manually and the extremity of the alidade cooperates with the graduations 9.

This alidade can consist of the usual form employed in known types of direction indicating apparatus, but preferably the alidade is shaped to resemble the field pattern of the exploring antenna system. As pointed out above, the exploring antenna system may be either the transmitting or receiving antenna, or both. More particularly, the form consists of the four-sided figure OABC. The enclosed angle at the pivot point O (which can, in addition, be adjustable) corresponds to the enclosed angle of the field pattern of the exploring antenna system at the source. The line OA bisects the angle BOC. Graduations 11 may be provided along the line OA for indicating the distance of the reflecting object from the source. With the enclosed angle of the alidade equal to the enclosed angle of the field pattern of the exploring antenna, the sides OB and OC will always enclose the arc 7 on the tube screen, and the direction of the reflecting object may be readily determined by suitably placing the alidade so that the sides OB and OC enclose the arc 7. The direction of the reflecting object may be read directly on the encircling arc 9.

The alidade 10, can, in addition, be constructed in such a manner that its transparency is not the same at the sides as at the center. When the alidade is constructed in this manner, the transparent portion of the alidade follows the line OA. The centering of the alidade will then be greatly facilitated, since the alidade may be centered by placing the transparent portion over the most brilliant portion of the arc 7.

With such an arrangement, it is clear that the survey of the field is panoramic. When there are several objects in the surveyed field, several arcs 7 will appear on the screen. If it is desired to limit the survey to a portion of the field, the transmitting or receiving antenna may be made to oscillate.

Figs. 3 through 5 illustrate desirable indications which may be produced on the screen of a cathode ray tube such as may be used in a direction and distance finding system. Figs. 6 through 8 illustrate apparatus for obtaining such indications. In Fig. 6, numeral 13 designates a cathode ray tube having a screen 1. The indication of the direction and distance of an object will appear on this screen 1. Coils 14, which are well known magnetic deflection coils, are rotated in the direction indicated by the arrow 15, by the driving means 30. Preferably, the driving means 30 is a motor known as a servomotor. This same driving means 30 is employed for rotating the receiving antenna system 16 which may be any well known directive antenna system. The deflection coils 14 are rotated in synchronism with the antenna system 16 and in some arrangements, the coils are oriented in the same direction as the components of the antenna system.

The coils 14 are supplied with a current having a saw-tooth wave form from the saw-tooth generator 17. Brushes and commutators 19 and 20 are employed to conduct the currents from the antenna system 16 to the receiver 18 and from the saw-tooth generator 17 to the coils 14. The intensity of the cathode ray is modulated by a grid 21, connected to the receiver 18 by the line 22. The intensity of the cathode ray may, of course, be varied in any other well known manner. The rotation of the coils 14 produces rotation of the cathode ray, and the saw-tooth currents or voltages produce radial motion of the cathode ray. The brilliance of the spot produced on the screen by the cathode ray is controlled by signals applied to the grid 21.

A high-frequency transmitter 31 is connected to an antenna system 32. This antenna system 32 may, or may not, be directional. If the antenna system 32 is directional, it should be rotated in synchronism with the antenna system 16 and the coils 14. Of course, if both the antenna system 16 and the antenna system 32 are directive, the directions of their maximum radiation, or sensitivity, should be substantially parallel. The output of the transmitter 31 is controlled by the impulse generator 33. This impulse generator 33 allows the transmitter 31 to transmit for short periods of time. A blocking circuit 34, coupled to the impulse generator 33, controls the operation of the receiver 18. When the transmitter 31 is transmitting, the receiver 18 is blocked. If desired, the blocking circuit 34 may be omitted, and the impulses transmitted by the transmitter 31 may be received. The reception of the impulses will, however, produce additional modulation of the cathode ray. The saw-tooth generator is synchronized with the impulse generator 33. A line 35 interconnects the generator 33 with the generator 17, so that the cathode ray always strikes the center of the screen at the end of some predetermined series of transmitted impulses. The time for the production of one radial line on the screen 1 may, for example, take a length of time equal to the length of time required for the transmission of seven pulses. At the beginning of the eighth pulse, the cathode ray returns to the center of the screen 1.

By the arrangement described above the rotation of the cathode ray is in synchronism with the rotation of the receiving antenna system. The cathode ray should also be synchronized with the receiving antenna system, so that there is some predetermined relation between the direction of a radial line and the direction of maximum sensitivity of the receiving antenna system. For example, when the antenna system 16 is oriented so that it points toward magnetic north, the radial line OA of Fig. 5 produced on the cathode ray screen may run upwardly in a vertical line.

In the operation of the system shown in Fig. 6, pulses of a short duration are transmitted or radiated from the antenna system 32. At the same time that a short pulse of electromagnetic energy is transmitted from the antenna system 32, a pulse along the line 35 commences motion of the cathode ray from the center of the tube outwardly. The electromagnetic pulse from the antenna 32 in its passage, strikes an object which reflects a portion of the energy contained in the pulse. The energy returns to the receiving antenna 16, passes through the receiver 18, and varies the intensity of the cathode ray by means of the grid 21. The length of time required for the pulse to go from the transmitter 31 out to the reflecting object and return to modulate the cathode ray, will determine the position of a brilliant spot on the radial line which was started when the pulse was first transmitted. This length of time is an indication of the distance traversed by the wave energy. If, at the same time that the pulses are transmitted, the coils 14 and the antenna system 16 are rotated, the position of the brilliant spot on the screen, with respect to the circumference of the screen, will indicate the direction of the reflecting object, since the reflected energy will be received substantially only when the receiving antenna is oriented to have its direction of maximum sensitivity in the direction of the reflecting object.

Instead of electromagnetic deflection of the cathode ray, one can employ electrostatic deflection of the type shown in Figs. 7 and 8. In Fig. 7, 36 designates a filament, 38 a cathode, 39 a focusing electrode, 40 a grid, and 41 accelerating electrodes. Similar reference numerals are used in Fig. 8. A two phase voltage source 23, which may be a diphased resistance generator controlled or operated by the rotating antenna system, is coupled to a modulator 29. A saw-tooth generator 17 supplies voltages of saw-tooth wave form to the modulator 29. All of these components are well known, and require no further detailed description. The output of the modulator 29 is coupled to the pairs of deflection plates 27 and 28. By this arrangement, both circular and radial motion of the cathode ray is produced.

Circular and radial motion of the cathode ray may also be produced by the arrangement shown in Fig. 8. In this figure, the two phase voltage source is connected directly to the deflection plates. If necessary, an amplifier may be inserted between the voltage source and the deflecting plates. Radial motion of the cathode ray is produced by the saw-tooth generator 17 connected to the truncated cone 42 and the cone 43. The electrostatic field produced between the two cones, 42 and 43, by the saw-tooth generator 17, causes the cathode ray to move radially of the tube screen.

Although I have shown preferred methods for producing circular and radial motion of the cathode ray, it should be understood that many other known forms of producing circular and radial motion of a cathode ray may be employed.

Although I have described the antenna systems as being two separate antenna systems, it is possible by suitably keying a single antenna system in a known manner to combine the functions of the two above mentioned antenna systems.

While I have described particular embodiments of my invention for purposes of illustration, it will be understood that various modifications and adaptations thereof may be made within the scope of the invention.

What is claimed is:

1. Direction and distance indicating system comprising means for generating electromagnetic waves, radiant acting means for transmitting said waves toward an object, radiant acting means for receiving waves reflected from said object, at least one of said radiant acting means being directive, means responsive to the received reflected waves to produce controlling voltages which vary in accordance therewith, means for changing the direction of said directive radiant acting means, a cathode ray tube, magnetic deflection coil means for controlling the ray of said tube, means for rotating the coils means about a predetermined axis passing through the tube to produce circular motion of said ray in timed relation with the changes in direction of said directive radiant acting means, a source of voltages connected to the coil means for producing therein periodic current impulses of sawtooth wave form to produce periodic radial movements of said ray, and means for applying said controlling voltages to said tube for controlling the intensity of said ray in accordance with the variations of said controlling voltages.

2. Direction and distance indicating system comprising means for generating short pulses of electromagnetic waves, radiant acting means for transmitting said waves toward an object, radiant acting means for receiving waves reflected from said object, at least one of said radiant acting means being directive, means responsive to the received reflected waves to produce controlling voltages which vary in accordance therewith, means for changing the direction of said directive radiant acting means, a cathode ray tube including a ray intensity control electrode, magnetic deflection coil means for controlling the ray of said tube, means for rotating the coil means about a predetermined axis passing through the tube to produce circular motion of said ray in timed relation with the changes in direction of said directive radiant acting means, a source of voltages connected to the coil means for producing therein periodic current impulses of sawtooth wave form to produce periodic radial movements of the ray in timed relation with said short pulses, and means for applying said controlling voltages to the intensity control electrode to control the intensity of said ray in accordance with variations of said controlling voltages.

3. Direction and distance indicating system as in claim 2 in which the cathode ray tube also includes a screen through which said axis passes, the periodic current impulses produce successive magnetic fields across the axis to cause the radial movements of the ray to originate from and return to a point on the screen in synchronism with said short pulses, and a source of periodic voltage impulses is connected to the intensity control electrode to produce range marker indications along the paths of the radial movements.

4. A direction and distance finding system comprising means for generating short pulses of electromagnetic waves, a first antenna system for radiating said waves toward an object, a second antenna system for receiving waves reflected from said object, at least one of said antenna systems being directive, driving means for rotating the directive one of said antenna systems, a receiver coupled to the other antenna system for converting the received waves into controlling voltages, a cathode ray tube including an intensity control electrode, magnetic deflection coil means for controlling the ray of said tube, means for rotating the coil means about a predetermined axis passing through the tube to produce circular motion of said ray, a source of voltages connected to the coil means for producing therein periodic current impulses of sawtooth wave form to produce periodic radial movements of said ray in synchronism with said short pulses, the driving means being connected to the means for rotating for controlling it to produce said circular motion in timed relation with the rotation of the directive one of said antenna systems, and means for coupling said receiver to said intensity control electrode to produce direction and distance indications.

HENRI G. BUSIGNIES.

REFERENCES CITED

The following references are of record in the file of this patent:

UNITED STATES PATENTS

| Number | Name | Date |
|---|---|---|
| 2,130,912 | Tolson | Sept. 20, 1938 |
| 2,143,035 | Smith | Jan. 10, 1939 |
| 2,223,224 | Newhouse | Nov. 26, 1940 |
| 2,231,929 | Lyman | Feb. 18, 1941 |
| 2,241,809 | De Forest | May 13, 1941 |

FOREIGN PATENTS

| Number | Country | Date |
|---|---|---|
| 820,350 | France | July 26, 1937 |